United States Patent [19]
Hennings et al.
[11] Patent Number: 4,860,269
[45] Date of Patent: Aug. 22, 1989

[54] ELECTROCHEMICAL TIME SWITCHING DEVICE

[75] Inventors: Detlev Friedrich Korl Hennings, Aachen; Hans-Peter Stormberg, Stolberg; Manfred Peterek, Aachen, all of Fed. Rep. of Germany

[73] Assignee: U.S. Philips Corporation, New York, N.Y.

[21] Appl. No.: 116,418

[22] Filed: Nov. 3, 1987

[30] Foreign Application Priority Data

Nov. 8, 1986 [DE] Fed. Rep. of Germany ....... 3638235

[51] Int. Cl.[4] .......................... G04F 8/00; H01G 9/18
[52] U.S. Cl. .................................... 368/107; 368/114; 368/327; 361/435
[58] Field of Search ................................ 368/107–108, 368/112–114; 307/112, 116, 118–119, 139, 141, 141.4; 324/94; 361/433, 434, 435

[56] References Cited

U.S. PATENT DOCUMENTS 3,768,015 10/1973 Moser .................................. 368/114
4,084,511 4/1978 Surjcek, Jr. ......................... 361/435

FOREIGN PATENT DOCUMENTS 269835 5/1901 Fed. Rep. of Germany .
172000 12/1922 United Kingdom .................. 324/94

OTHER PUBLICATIONS

IBM Technical Disclosure Bulletin, vol. 17, No. 9, 2/75, p. 2817.

*Primary Examiner*—Vit W. Miska
*Attorney, Agent, or Firm*—Norman N. Spain

[57] ABSTRACT

An electrochemical time switching device comprising a hollow body (1). The hollow body (1) is filled with a liquid electrolyte (12), in which a disintegrable anode (11) and a cathode (8) are arranged, between which a charge flows through the electrolyte (12) when a voltage is applied between the anode connection (6) and the cathode connection (7). An elastic sleeve (9) is arranged in the hollow body (1) between the anode connection (6) and the anode (11) and this sleeve encloses an electrical lead-in wire (10) interconnecting the anode connection (6) and the anode (11). The cross-section of the lead-in wire (10) is smaller than the cross-section of the anode (11) and its length is smaller than the length of the relieved sleeve (9).

4 Claims, 1 Drawing Sheet

ELECTROCHEMICAL TIME SWITCHING DEVICE

Figure 1:
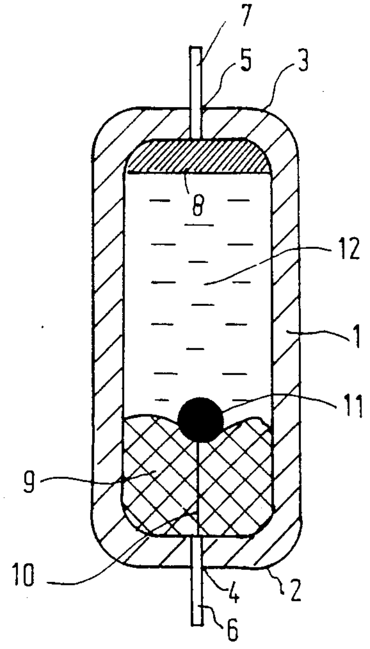

The invention relates to an electrochemical time switching device comprising a hollow body, which is filled with a liquid electrolyte and in which an electrical discharge flows between a distintegrable anode and a cathode when a voltage is applied between the anode connection and the cathode connection.

The term "electrochemical time switching device" is to be understood to mean an element which, after a given quantity of charge has flown through an electrolyte, starts a switching operation, by which, for example, an electrical apparatus can be switched off after a given time of operation. Such devices can be used, for example, in conjunction with lamps. For example, high-pressure gas discharge lamps change their light-technical properties at the end of their natural lifetime. They no longer satisfy the requirements as to colour temperature, colour rendition and light output, which correspond to their specification, although such a lamp still emits light. In order to avoid this, such lamps must be switched off before the end of their natural lifetime. For this purpose, an electrochemical time switching device can be used.

US-PS 3769575 discloses an electrochemical switching device of the kind mentioned in the opening paragraph. In this case, a liquid electrolyte is introduced into a hollow body of copper serving as an electrode and a U-shaped copper wire serving as a second electrode is located in this electrolyte. When a voltage is applied to the respective connections of the electrodes, the U-shaped copper wire is gradually disintegrated. The rupture of the copper wire leads to a switching operation.

A further electrochemical time switching device is known from US-PS 3768015, in which an electrode is arranged at each one of the ends of a cylindrical hollow body. When a voltage is applied to the connections of the electrodes, a charge flows through a liquid electrolyte from one electrode to the other. One electrode is then disintegrated. A reference electrode is arranged at the cylindrical hollow body at the area of the disintegrable electrode and this reference electrode emits a signal corresponding to the mass of the disintegrable electrode. At a given voltage of the reference electrode, a switching operation is started.

These known electrochemical time switching devices are of complicated construction and require a complicated electronic system for starting the switching operation.

The invention has for its object to provide an electrochemical time switching device, which has a simple construction and is inexpensive and in which the switching operation is started in a simple manner.

According to the invention, this object is achieved in an electrochemical time switching device of the kind mentioned in the opening paragraph in that an elastic sleeve is arranged in the hollow body between the anode connectiop and the anode, this sleeve enclosing an electric lead-in wire which interconnects the anode connection and the anode and whose cross-section is smaller than the cross-section of the anode and whose length is smaller than the length of the relieved sleeve.

In this electrochemical time switching device, the lead-in wire is inserted between the anode and the anode connection into the elastic sleeve in such a manner that the sleeve is compressed and stretched between the anode and the anode connection. The sleeve is bulged at the area at which the anode exerts a pressure on it. After a voltage has been applied to the anode connection and the cathode connection, a charge flows from the anode through the liquid electrolyte to the cathode. The anode is gradually dissolved. The quantity of the dissolved anode material is proportional to the quantity of charge flown through the device and can be determined by means of the law of Coulomb. After the complete disintegration of the anode, the elastic sleeve is relieved, encloses the now free end of the lead-in wire and thus prevents current from flowing between the lead-in wire and the cathode. The lead-in wire must be chosen to be so thin that the elastic sleeve, after having been relieved, separates the lead-in wire completely from the electrolyte.

An electrochemical switching device of simple construction is obtained according to a further embodiment of the invention, in which the hollow body is cylindrical, while the anode with the sleeve and the lead-in wire is arranged at one end of this body and the cathode is arranged at its other end.

In a further embodiment of the invention, the anode is spherical. Thus, it is guaranteed that the anode is disintegrated uniformly.

Figure 2:
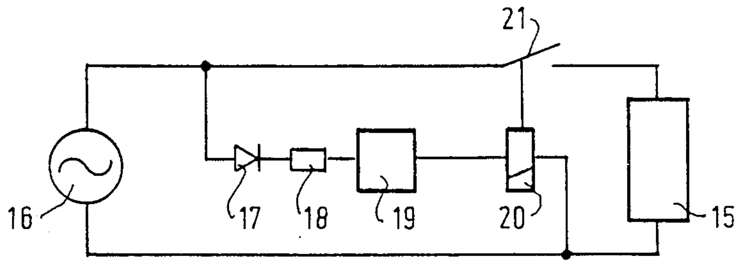

In order that the invention may be readily carried out, it will now be described more fully, by way of example, with reference to the accompanying drawing, in which:

FIG. 1 is a longitudinal sectional view of an electrochemical time switching device, and FIG. 2 shows an electrical circuit arrangement, in which an electrochemical time switching device is used.

The electrochemical time switching device shown in FIG. 1 comprises an essentially closed cylindrical hollow body 1, which has at each of its two ends 2 and 3 an opening 4 and 5, respectively, in each of which is arranged a connection wire 6 and 7, respectively. The hollow body 1 may consist, for example, of carbon, glass or ceramic material. A cathode 8 consisting of conductive non-corrosive material, for example of graphite or vitreous carbon is arranged in the interior of the hollow body 1 at its end 3. An elastic sleeve 9, for example of rubber, is provided in the cylindrical hollow body 1 at its other end 2. The sleeve 9 encloses a lead-in wire 10, which consists, for example, of silver and has a diameter of about 5 $\mu$m. The lead-in wire 10 is connected on the one hand to the anode connection wire 6 and on the other hand to a spherical anode 11. The length of the lead-in wire 10 is chosen so that the spherical anode 11 is pressed into the elastic sleeve 9 and the sleeve 9 is thus kept under pressure. The anode 11 may consist, for example, of silver or copper. The remaining inner space of the cylindrical hollow body 1 is filled with a liquid electrolyte 12, which may consist, for example, of silver nitrate or copper sulfate. The interior of the hollow body 1 must be filled with the electrolyte 12 in such a manner that no air cushion can be formed in the interior.

When a direct voltage is applied to the anode connection wire 6 and the cathode connection wire 7, a current flows from the anode 11 through the electrolyte 12 to the cathode 8. With this flow of charge, the anode 11 is gradually dissolved. After the anode 11 has been completely disintegrated, the sleeve 9 is relieved and isolates the lead-in wire 10 from the liquid electrolyte 12. Since the lead-in wire 10 no longer has a connection with the electrolyte 12, also no current can flow any longer to the cathode 8. The electrochemical time switching device shown in FIG. 1 thus prevents after a given time that a further current flows through it. The duration of the flow of charge through the electrolyte 12 is determined by the mass of the anode 11.

Such an electrochemical time switching device can be used in an electrical apparatus, which must be switched off at the end of its natural lifetime. FIG. 2 shows a lamp 15, which is fed from an alternating voltage source 16. A diode 17 for rectifying the alternating voltage is connected to a connection of the alternating voltage source 16. A voltage-limiting resistor 18 follows the diode 17. One electrode of an electrochemical time switching device 19 is connected to the connection of the resistor 18 not connected to the diode 17 and the other electrode of this device is connected to a connection of a relay 20. The relay is further connected to the other connection of the alternating voltage source 16. The relay 20 actuates an electrical switch 21, which is connected in series with the lamp 15 to the alternating voltage source 16. The switch 21 is closed for the time in which a current flows through the electrochemical time switching device 19. When the anode 11 has been disintegrated, that is to say that the flow of current through the time switching device 19 is interrupted, the relay 20 opens its switch 21 and the lamp 15 is separated from the alternating voltage source 16.

Instead of the relay, a detection device comprising at least one transistor or one thyristor may also be used.

We claim:

1. An electrochemical time switching device comprising a hollow body, a liquid electrolyte filling said hollow body, a disintegrable anode and a cathode located within said hollow body and separated one from the other by said liquid electrolyte, a cathode connection and an anode connection, each extending out of said hollow body, a lead-in wire connecting said anode connection and said anode, a compressed elastic sleeve arranged between said anode and said anode connection and enclosing said lead-in wire, the cross-section of said lead-in wire being smaller than the cross-section of said anode and the length of said lead-in wire being smaller than the length of said sleeve when uncompressed and said lead-in wire being completely separated from said electrolyte by said elastic sleeve when said sleeve is uncompressed.

2. An electrochemical time switching device comprising a hollow body (1), which is filled with a liquid electrolyte (12) and in which an electrical charge flows between a disintegrable anode (11) and a cathode (8) when a voltage is applied between an anode connection (6) and a cathode connection (7), characterized in that a compressed elastic sleeve (9) is arranged between the anode connection (6) and the anode (11), said sleeve enclosing a lead-in wire (10) which interconnects the anode connection (6) and the anode (11) and whose cross-section is smaller than the cross-section of the anode (11) and whose length is smaller than the length of the sleeve (9) when uncompressed, said sleeve, when uncompressed, completely separating said lead-in wire (10) from said electrolyte.

3. An electrochemical time switching device as claimed in claim 2, characterized in that the hollow body (1) is cylindrical, while the anode (11) with the sleeve (9) and the lead-in wire (10) is arranged at one end of this body and the cathode (8) is arranged at its other end.

4. An electrochemical time switching device as claimed in claim 2, characterized in that the anode (11) is spherical.

* * * * *